United States Patent [19]
Ciriello et al.

[11] Patent Number: 5,110,339
[45] Date of Patent: May 5, 1992

[54] H-28 MACHINE HAVING AN ADJUSTABLE NECK RING LEVER

[75] Inventors: Michael P. Ciriello, Prospect; Richard A. Gorski, Suffield, both of Conn.

[73] Assignee: Emhart Glass Machinery Inc., Towson, Md.

[21] Appl. No.: 690,078

[22] Filed: Apr. 23, 1991

[51] Int. Cl.⁵ .............................................. C03B 9/195
[52] U.S. Cl. ...................................... 65/238; 65/241; 65/307; 65/239
[58] Field of Search ................. 65/307, 237, 238, 239, 65/242, 240

[56] References Cited

U.S. PATENT DOCUMENTS

| 1,878,465 | 9/1932 | Canfield | 65/171 |
| 4,339,264 | 7/1982 | Dahms | 65/239 |

Primary Examiner—Richard V. Fisher
Assistant Examiner—John Hoffmann
Attorney, Agent, or Firm—Spencer T. Smith

[57] ABSTRACT

A neck ring mechanism of an H-28 glass forming machine is operated by a neck ring lever which is pivotally supported and controlled by a cam roller which is displaced along a timing cam. To precisely define the timing of the lever, the lever is displaceable relative to a sleeve which is secured to the shaft and a control knob operating through an adjuster plate assembly adjusts the axial location of the lever.

3 Claims, 2 Drawing Sheets

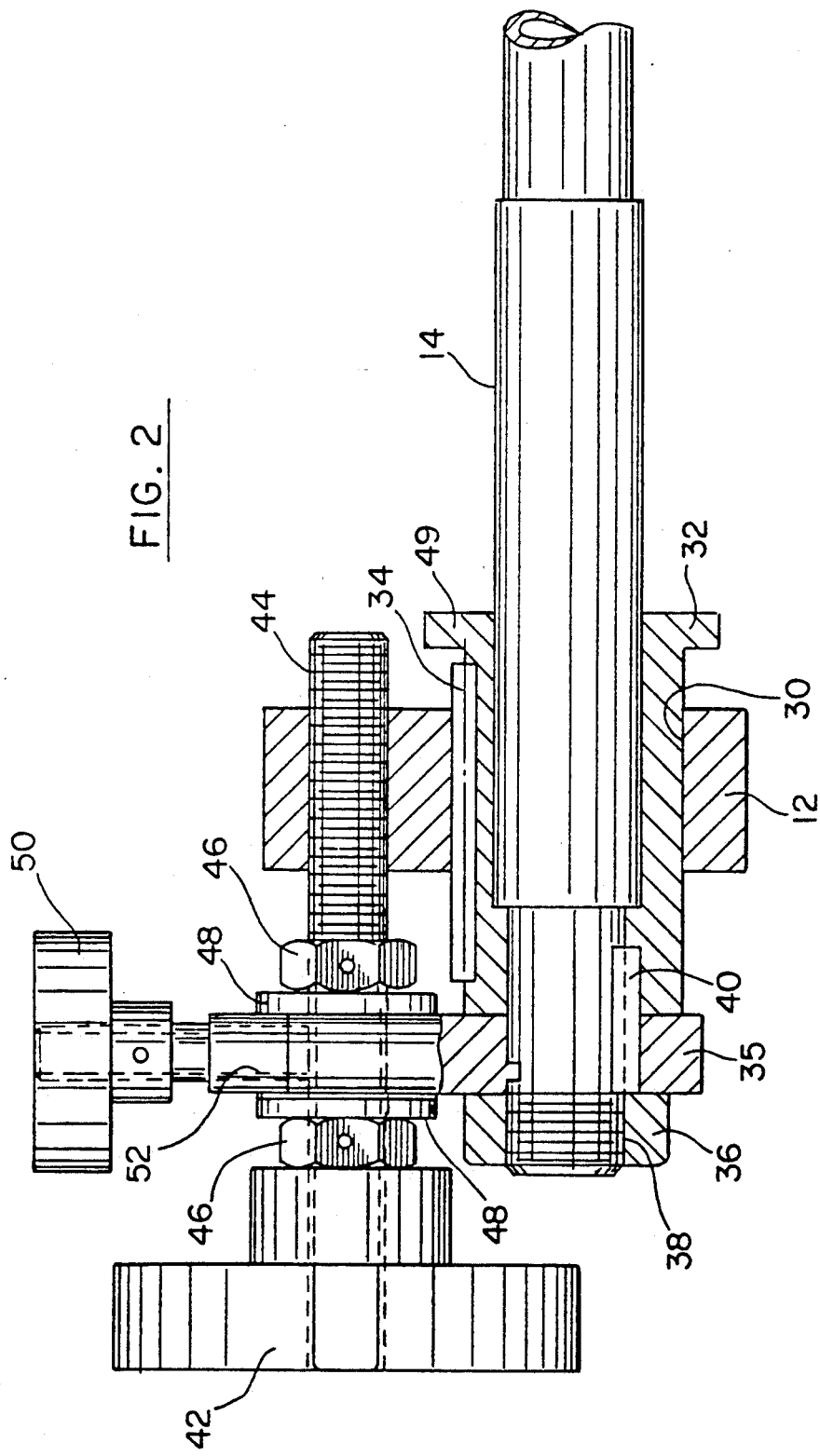

H-28 MACHINE HAVING AN ADJUSTABLE NECK RING LEVER

The present invention relates to machines for making glassware and more particularly to a machine commonly used in the glass industry today and referred to as an H-28 machine.

An H-28 machine such as in disclosed in U.S. Pat. 4,339,264 is a single table continuous rotary motion machine having a plurality of individual sections mounted for rotation about the axis of the machine. Each section produces glassware each complete revolution or cycle of the machine. H-28 machines are used to make seamless glassware. In this process, a moile is formed on top of a parison for gripping purposes. The moile is latter cut away from the parison leaving the formed glassware. A gripping mechanism which is part of a neck ring lever grips this moile for a selected portion of the 360° cycle and the operation of the gripping mechanism is controlled by a fixed timing cam which must be very precisely located. The desired critical control was difficult to establish and maintain.

It is accordingly an object of the present invention to provide an improved neck ring lever which will facilitate the setting and maintaining the control cycle for the gripping mechanism.

Other objects and advantages of the present present invention will become apparent from the following portion of this specification and from the accompanying drawings which illustrates in accordance with the mandate of the patent statutes a presently preferred embodiment incorporating the principles of the invention.

Referring the drawings:

FIG. 2 is a side cross sectional view of a portion of the neck ring lever of this mechanism.

Figure 1:
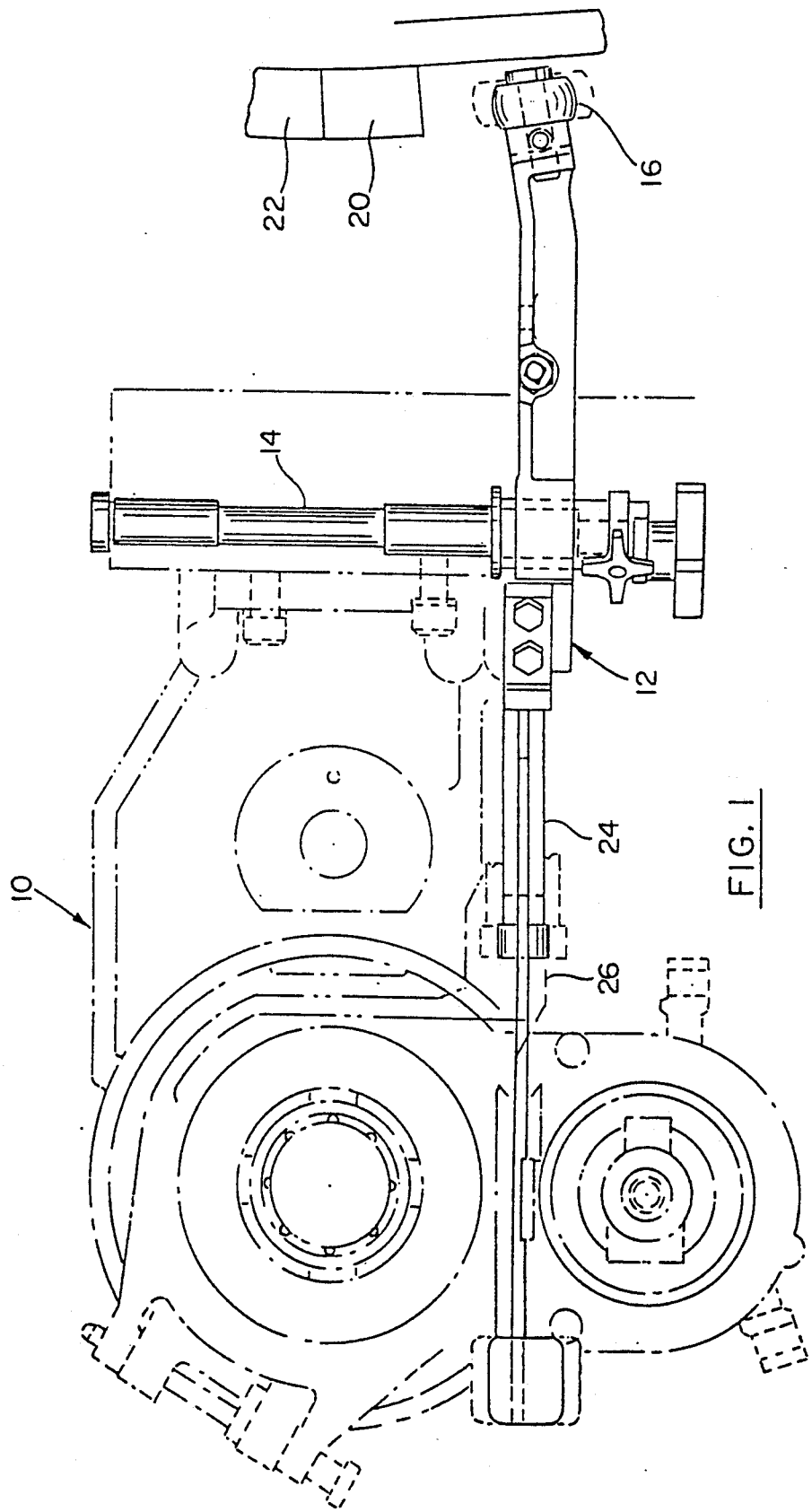
FIG. 1 is a top view of a neck ring mechanism of an H-28 machine.

A neck ring assembly 10, which is shown in phantom of an H-b 28 machine, is opened and closed to grip and release a moile by a neck ring lever 12 which is pivotally mounted on a shaft 14. A cam roll 16 rotatably mounted at the end of the neck ring lever remote from the neck ring mechanism (the neck ring mechanism is rotatively displaced around the center of an H-28 machine) and when the cam roller rides up a cam surface 20 to a higher elevation 2 the neck ring lever will rotate counterclockwise to operate the neck ring mechanism (the end of leaf spring 24 is displaced counterclockwise to displace a neck ring mechanism control linkage 26). The time when this occurs is critical. Slidably located within a horizontal through bore 30 in the neck ring lever 12 is a sleeve 32 which receives the shaft 14. A suitable key 34 prevents rotation of the sleeve 32 relative to the neck ring lever 12. Slidably mounted on the free end of the shaft is an adjuster plate 35 which is secured in position by a suitable nut 36 which is received by the threaded end 38 of the shaft 14. Relative rotation between the shaft 14, sleeve 32 and adjuster plate 34 is prevented by a suitable key 40.

A control knob 42 controls the axial displacement of the neck ring lever 12 along the sleeve 32. The threaded shaft 44 of the control knob passes through a pair of nuts 46 which are affixed to the threaded shaft 44 and which loosely locate washer 48 against opposed sides of the adjuster plate (the threaded screw passes through an enlarged hole in the adjuster plate 35) to define the adjuster plate assembly. Rotation of the control knob 42 accordingly effects axial displacement of the lever along the shaft 14, by displacing the lever between the adjacent nut 46 of the adjuster plate assembly and the flange 49 of the sleeve, to advance or retard the cam roll and hence the timing of the neck ring gripping mechanism. To maintain the desired timing a set screw 50 which passes through a hole 52 in the top portion of the adjuster plate forcefully engages the threaded screw.

We claim:

1. An H-28 machine having a neck ring lever comprising
    a lever for operating a neck ring mechanism,
    cam roller means at one end of said lever,
    means for supporting said lever for selected rotation about a horizontal axis including,
    shaft means, and
    sleeve means secured to said shaft means,
    said lever having a through bore for slidably receiving said sleeve means, and
    means for axially displacing said lever relative to said sleeve means so that the location of said cam roller cam be advanced or retarded, comprising
    an adjuster plate secured to said shaft means having a through bore therein, and
    control means including,
    a threaded shaft having a knob at one end,
    a pair of nuts pinned to said threaded shaft on either side of said adjuster plate, and
    a threaded through bore in said lever for receiving the free end of said threaded shaft.

2. An H-28 machine according to claim 1, further comprising set screw means extending through a threaded bore in said adjuster plate for preventing the rotation of said threaded screw relative to said adjuster plate.

3. An H-28 machine according to claim 2, wherein said sleeve means includes a flange for capturing said lever between said flange and said adjuster plate.

* * * * *